United States Patent
Friedman

(10) Patent No.: US 6,452,507 B1
(45) Date of Patent: Sep. 17, 2002

(54) EXTERIOR MOUNTED SHIELD FOR VEHICLE MOUNTED TOLL COLLECTION IDENTIFIER

(75) Inventor: Solomon Friedman, Brooklyn, NY (US)

(73) Assignee: RandolphRand.com LLC, New York, NY (US)

( * ) Notice: Subject to any disclaimer, the term of this patent is extended or adjusted under 35 U.S.C. 154(b) by 0 days.

(21) Appl. No.: 09/817,386

(22) Filed: Mar. 26, 2001

(51) Int. Cl.⁷ .............................................. G08G 1/065
(52) U.S. Cl. ................. 340/928; 340/572.8; 340/693.9; 340/933; 40/591; 40/643; 248/352
(58) Field of Search .................. 340/928, 10.3, 340/10.33, 10.4, 933, 572.8, 435, 436, 432, 693.9; 235/382, 375; 40/591, 643; 248/200, 352; 342/44, 42, 51

(56) References Cited

U.S. PATENT DOCUMENTS

| 5,196,846 | A | | 3/1993 | Brockelsby | 340/933 |
| 5,552,789 | A | * | 9/1996 | Schurermann | 340/5.21 |
| 5,695,228 | A | * | 12/1997 | Storer | 293/115 |
| 5,767,954 | A | * | 6/1998 | Laakmann | 356/28 |
| 5,960,572 | A | * | 10/1999 | DeVito | 40/593 |
| 6,127,938 | A | | 10/2000 | Friedman | 340/693.6 |
| 6,176,506 | B1 | * | 1/2001 | Blake | 280/507 |

* cited by examiner

Primary Examiner—Daniel J. Wu
Assistant Examiner—Davetta W. Goins
(74) Attorney, Agent, or Firm—Lilling & Lilling P.C.

(57) ABSTRACT

A protective shield is disclosed for housing an electronic toll collection identifier on the outside surface of a motor vehicle. It includes a flat, rectangular base portion with openings at the four corners. Screws are used to install the electronic toll collection identifier and the base portion to the motor vehicle, generally in the vicinity of the license plate. Rubber-coated arms extend outward from the base and substantially surround the electronic toll collection identifier, and thereby protect it from frontal impact.

3 Claims, 4 Drawing Sheets

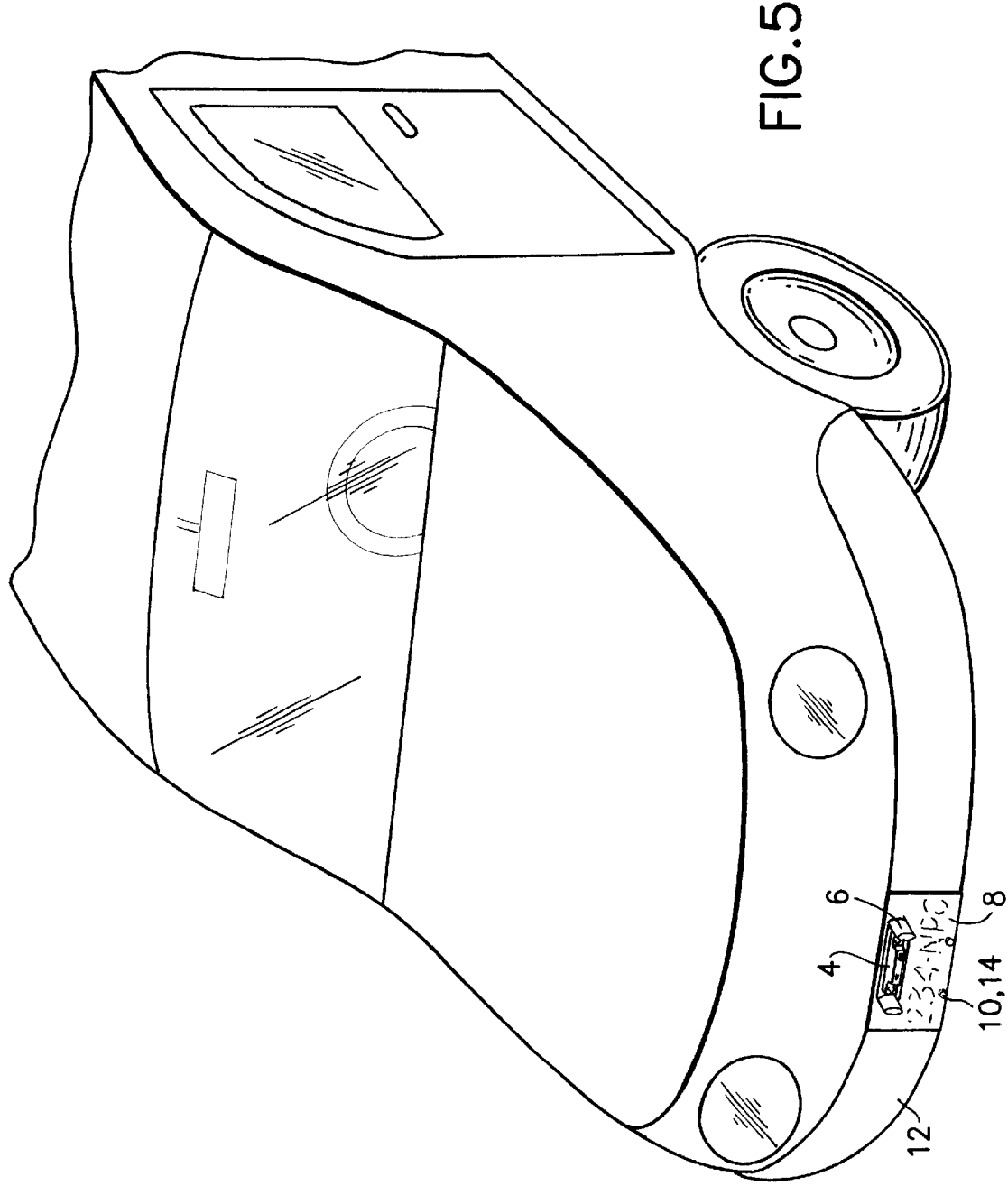

EXTERIOR MOUNTED SHIELD FOR VEHICLE MOUNTED TOLL COLLECTION IDENTIFIER

FIELD OF THE INVENTION

This invention relates to the transportation industry and, in particular, to a device for protecting toll collection identifiers that are mounted on the outside of a motor vehicle.

BACKGROUND OF THE INVENTION

For many years, federal, state and local governments have charged tolls on certain public roads, bridges and tunnels. Initially, this was for the purpose of recouping the costs of construction. After construction costs were collected, tolls were continued in order to provide funds for highway, bridge and tunnel maintenance and as an additional revenue stream for the government.

Whatever the reason may have been for the original enactment of tolls, tolls are now firmly entrenched in the landscape. Most major interstate roadways, bridges and tunnels have tolls and are likely to continue having tolls for the foreseeable future.

Traditionally and for many decades, tolls could be paid only with cash. Then, tokens were created to facilitate payment of tolls. More recently, electronic transmitters have become popular. These transmitters are mounted in the automobile and transmit a signal to a receiver at the tollbooth and the driver's account is thereby debited for the amount of the toll. These electronic toll collection identifiers have become exceptionally popular, because they greatly speed up the flow of traffic. This has the advantage of preventing delays for the driver and is also good for the environment, as it prevents cars from idling unnecessarily, whereby the fumes from the cars accumulate and cause unnecessary pollution to the atmosphere.

More recently, individually coded electronic transducers are being supplied for mounting in motor vehicle systems. Once such system, introduced in New York State and known as E-Z PASS, is coded to provide an electronic signal unique to a particular vehicle. The owner of the vehicle may obtain the transponder device from the appropriate governmental authorities. Thereafter, the transducer is typically mounted on the windshield on the inside of the motor vehicle and emits a signal, which identifies that particular vehicle.

As the vehicle approaches a toll station, an antenna located on a receiver at the toll station ascertains the presence of the vehicle and receives the vehicle identification signal. This allows the toll authority to debit the appropriate toll to the account of the driver, which had previously been established at the time that the driver obtained the transducer from the toll collection authority.

As necessary, the driver can periodically replenish his account, so that there will always be sufficient funds for payment of tolls.

This toll collection system advantageously simplifies the process of collecting tolls, speeds up traffic flow through the toll station, and reduces the cost of collecting tolls by dispensing with the need to have an attendant at the toll station to manually collect cash and to provide change.

In most situations, the electronic toll collection identifier is mounted on the inside of the windshield of the automobile. My earlier U.S. Pat. No. 6,127,938 discloses one particular device for installing the electronic toll collection identifier inside the car, either on the windshield on a sun visor or in some other location convenient and accessible to the windshield, so that its signal can be received at the tollbooth.

For various reasons, there are motor vehicles where the electronic toll collection identifier cannot be mounted in the vicinity of the inside of the windshield. Sometimes this is due to the fact that the windshields are tinted with a certain film that partially blocks the signals. In other cases, the size of the motor vehicle, such as large trucks, may be such that a toll collection identifier mounted on the inside of the windshield is out of position and cannot be easier detected at the tollbooth.

Therefore, there is sometimes a need for mounting the electronic toll collection identifier on the outside of the automobile. Such a positioning is shown in my earlier U.S. Pat. No. 6,127,938. Brockelsby (U.S. Pat. No. 5,196,846) also shows an external mounted electronic toll collection identifier.

The problem with the external mounted electronic toll collection identifiers is that the existing structures do not properly protect the units. These units are relatively fragile electronic devices. A tap or bang that may otherwise not damage a bumper or fender of a motor vehicle can render these electronic devices inoperable.

Therefore, there is a need in the industry for a secure structure that will protect an electronic toll collection identifier, when it is mounted on the outside of a motor vehicle, so it will not be damaged when the outside of the motor vehicle is struck.

SUMMARY OF THE INVENTION

Therefore, it is an object of this invention to provide a protective shield for an electronic toll collection identifier. The shield may be mounted in the vicinity of the license plate, or elsewhere on the front of the motor vehicle.

The protective shield includes a metal base plate that can be secured directly onto the motor vehicle. There are also rubber coated arms on each side that extend out perpendicularly, and thereby surround the electronic toll collector identifier in order to protect it from damage.

Any suitable method may be used to attach the electronic toll collection identifier to the shield. For example, screws may be used to pass through openings in the electronic toll collection identifier and the shield and then engage a threaded opening within the bumper of the motor vehicle. In other embodiments, there may be hooks or latches on the arms that interact with notches in the electronic toll collection identifier.

BRIEF DESCRIPTION OF THE DRAWINGS

FIG. 5 is a front view of a motor vehicle on which the shield of this invention is positioned.

DETAILED DESCRIPTION OF THE INVENTION

Figure 1:
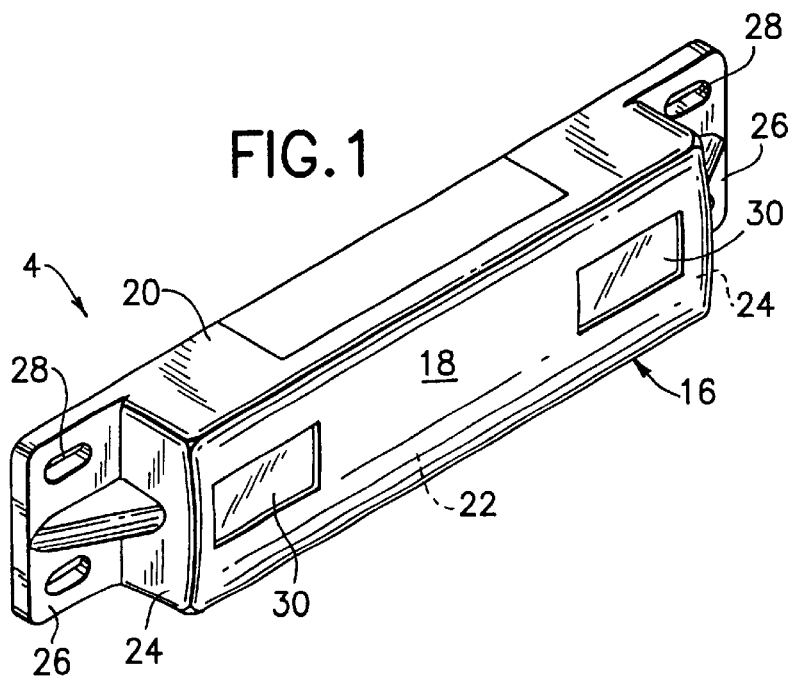
FIG. 1 is a front perspective view of an electronic toll collection identifier.

All types of motor vehicles, including automobiles, trucks, buses, motorcycles, construction equipment, agricultural equipment, etc., may from time-to-time be provided with electronic toll collection identifiers. For the sake of illustration, the invention will be described with respect to only an automobile. It may be appreciated that with equal facility the shield of this invention may be similarly affixed to any other motor vehicle.

As is known in the industry, an automobile 2 may be provided with an electronic toll collection identifier (hereinafter Identifier) 4. For obvious reasons, the Identifier must be mounted in the automobile in such a manner that its signal is not blocked and can be received by an antenna at a receiver at any toll station. In most situations, the Identifier is positioned inside the car in the vicinity of the windshield.

This invention involves the situation where the Identifier is mounted on the outside of the car. In such situations, the most ideal positioning of the Identifier is in the vicinity of the license plate 8. This is because it is usually the front most portion of the car and there are no portions of the car in front of it that would obstruct the signal from the Identifier.

Locating the Identifier inside the hood is problematic, because the front-end of the car will typically block or distort the emitted signal from the Identifier. For similar reasons, placing the Identifier on the undersurface of the front-end provides similar difficulties with the signal being blocked or distorted. Positioning of the Identifier at the extreme front-end, in the vicinity of the license plate, provides the best position for emitting the signal with a reasonable degree of certainty that it will be received by the antenna at the receiver at the toll station.

Whether the Identifier is positioned in the vicinity of the license plate or underneath the front-end, it still is subject to a far greater degree of damage than it would be if it were mounted on the inside of the automobile. In the situation where the Identifier is located on the undersurface of the automobile, rocks or any other road obstacles can easily bounce up and damage the Identifier. If the Identifier is located in the vicinity of the license plate it may have less possibility of being damaged by road obstacles and hazards, such as rocks, but they have other situations where they are vulnerable. In parking lots and garages, it is not uncommon for the front-end of an automobile to be tapped or hit when another car parks too close or for the driver himself to accidentally hit his front-end against a pole or another car. In either of these situations, the exposed Identifier can easily be damaged and thus its signal would be disabled.

As shown in FIG. 5, the shield 6 for the identifier 4 is mounted on the front-end of the car in the vicinity of the license plate 8.

As is well known, most license plates have holes 10 at the four corners and a threaded screw 14 is used to secure the license plate to the front bumper 12 of the automobile.

A conventional Identifier, of the type distributed in New York State, is illustrated in FIG. 1. In the central region, there is an enclosed box 16 inside of which the electronics of the Identifier are stored. The closed box construction includes a front panel 18, top and bottom panels 20 and 22 and side panels 24. These panels are constructed in known manner to make an enclosed integral box with a rear base 32 which includes side flanges 26. The exact shape and configuration of the Identifier is known in the art and is based on the particular unit distributed in the various States. In known manner, the flanges 26 include holes 28 at the four corners, so that screws may be used to secure the Identifier within the same openings of the bumper as are used for securing the license plate.

The difficulty with this positioning of the Identifier on the automobile is that the Identifier thereby necessarily sticks out to some extent in front of the bumper of the automobile. In such a position, anytime that the front of the car is struck, the Identifier is necessarily struck. Due to its necessarily fragile nature, the electronic components inside the Identifier are damaged or destroyed by such impacts.

In order for antennae at toll collection booths to receive the signal from the Identifier, in known manner, the front panel 18 of the Identifier includes windows 30, so that the signal can be emitted from the Identifier.

Figure 2:
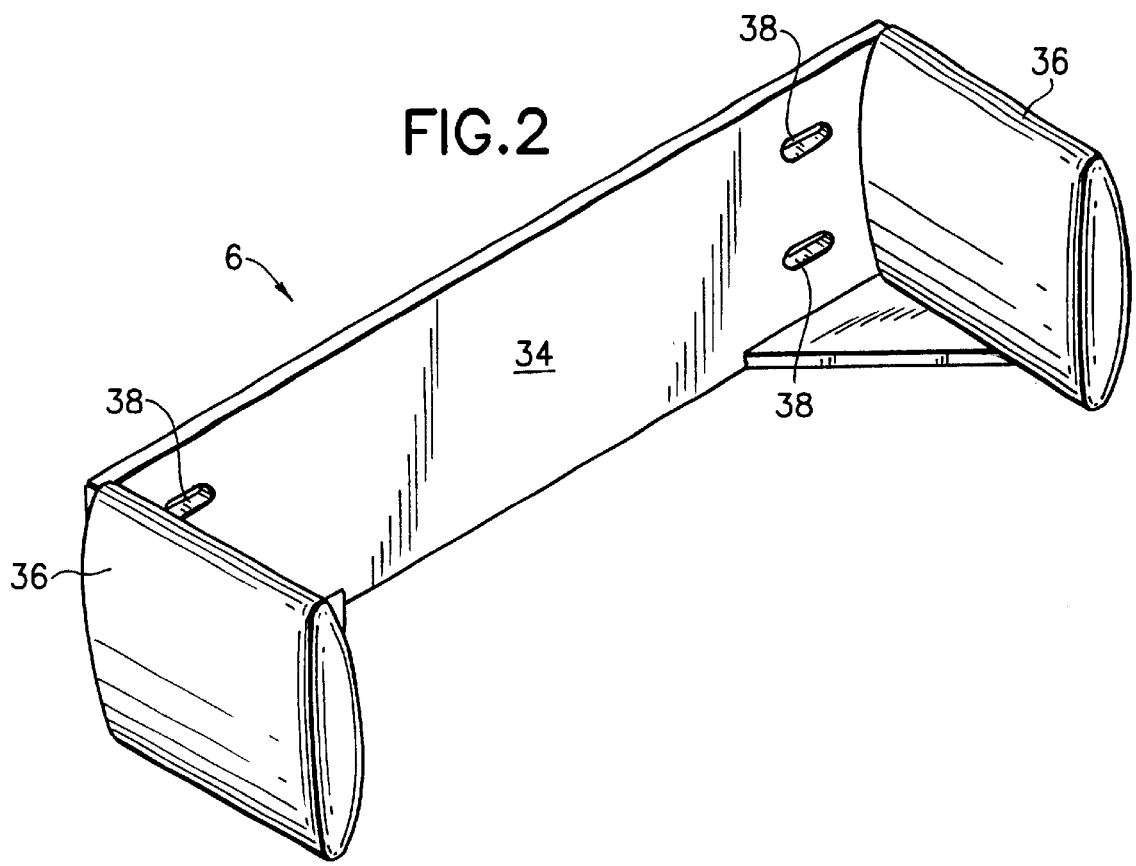
FIG. 2 is a front perspective view of the shield of this invention.

The shield of this invention is best-illustrated in FIG. 2. It includes a flat, rectangular base 34 made out of a strong, sturdy, protective material. In the preferred embodiment, it is made of stainless steel. Included at the four corners are holes 38, which are intended to correspond with the location of the holes 28 on the side flanges 26 of the Identifier 4, as will be hereinafter explained.

Made integral with the base 34 of the shield 6 are outwardly extending arms 36. While the arms may typically be made of stainless steel, they are coated with rubber in order to provide protection for the Identifier. The particular shape and dimension of the arms is selected so that the height of the arms will be greater than the height of the Identifier and the depth or length of the arms will be greater than the thickness or depth of the Identifier itself.

Figure 3:
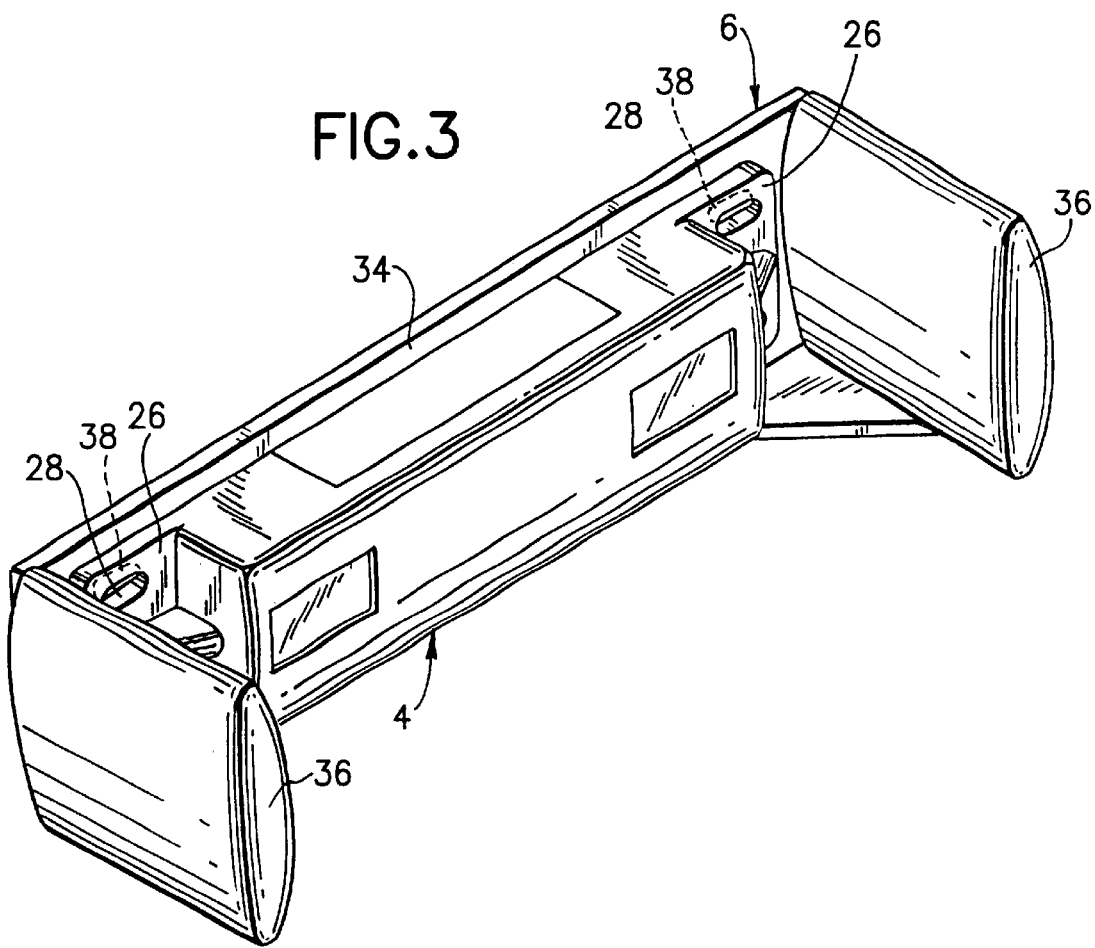
FIG. 3 is a front perspective view of the electronic toll collection identifier inserted in position in the shield.

FIG. 3 shows the Identifier installed within the shield. As seen, the holes 28 in the side flanges 26 are in alignment with the holes 38 in the base 34 of the shield 6. In this manner, the same screws can be used for securing the Identifier to not only the shield, but also to the same openings in the bumper that are used for securing the license plate.

The use of screws permits the easy installation and removal of both the Identifier and the shield. In some embodiments, it may be desirable to more permanently affix the Identifier to the shield, as by adhesives, but this limits the ability to remove the Identifier from the shield for repair or replacement.

Moreover, it may be appreciated that the shield and the Identifier may be installed with screws to any openings at the front of the automobile and not just the openings used for securing the license plate. Reference is made to the holes for the license plate, because this is a central location on the bumper and generally the preferred location for the Identifier.

In position in the shield, the rubber coated arms 36 necessarily extend out and partially surround the Identifier. By this means, any large object striking from the front will strike the rubber-coated side arms and not impact on the Identifier. This extends the useful life of the Identifier, as it will not be impacted by routine hits and bumps that the automobile may have during its travel.

In some embodiments, it may be desirable to enclose the front of the shield over the front panel of the Identifier, but this creates disadvantages. Such a front panel may include windows to permit transmission of the signal from the Identifier. Even with such windows, the front panel is generally not necessary.

Because the Identifier is relatively narrow, perhaps only 6", even without a front panel, the likelihood of being impacted by something so small that it would not engage one of the rubber coated arms is remote. Further, it is usually desirable to eliminate the front panel in order to ensure better transmission of the signal from the Identifier. Even with windows, any front panel necessarily can cause transmission problems of the signal.

Figure 4:
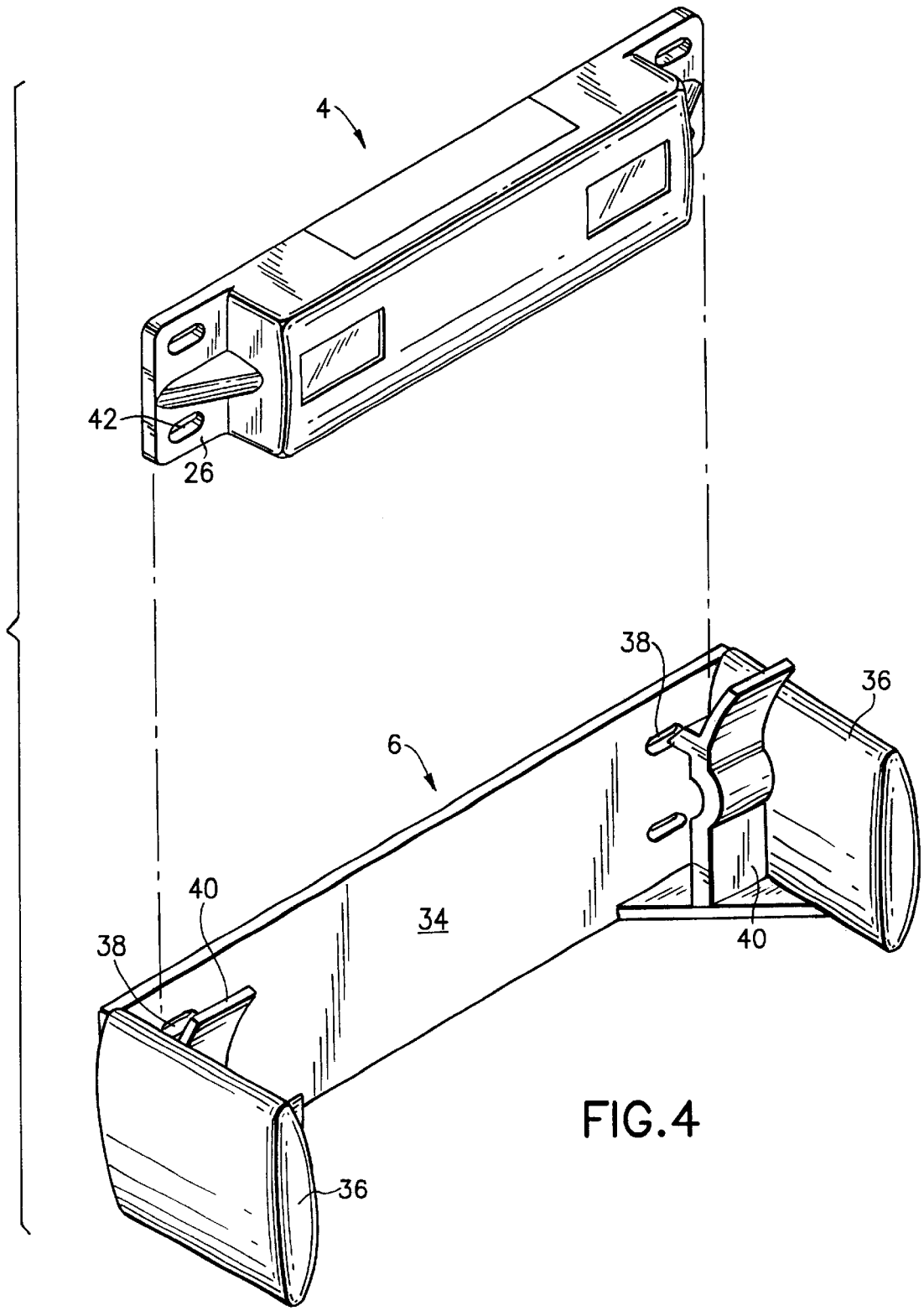
FIG. 4 is a front perspective of an alternate embodiment of the shield of this invention, and showing in exploded view the electronic toll collection identifier.

An alternate embodiment of the shield is illustrated in FIG. 4. Such a shield includes the same base 34 with mounting holes 38, and the same rubber coated side arms 36. The distinction in this embodiment is that L-shaped hooks or latches 40 extend out from the inner surface of both arms 36. These hooks engage respective openings 42 in the side panels 24 of the Identifier. This quick release method of installing the Identifier in the shield may be useful to take the Identifier on and off the shield quickly. In such an embodiment, the screw openings of the Identifier would not be used and only the shield would be mounted on the front bumper of the automobile.

While this shield and protective device are described as being located in the vicinity of the license plate, it may be appreciated that they could just as easily be located on any other outer surface of the automobile with the same effect.

The invention is described in detail with reference to a particular embodiment, but it should be understood that various other modifications can be effected and still be within the spirit and scope of the invention.

I claim:

1. A protective shield for mounting an electronic toll collection identifier on an outside surface of a motor vehicle, wherein said electronic toll collection identifier includes a protective box for electronic circuitry and side flanges with openings, wherein the protective shield comprises: a flat, rectangular shaped base of a strong, sturdy, protective material with openings at the four corners; and outwardly extended rubber-coated arms integrally made with said base; wherein said electronic toll collection identifier is mounted on said base of said protective shield by means of screws which are inserted through said openings in said base and said flanges of said electronic toll collection identifier and said screws being secured within openings on said motor vehicle for mounting said protective shield on said motor vehicle, and wherein said rubber-coated arms of said protective shield surround said electronic toll collection identifier and protect it from frontal impact while mounted on said motor vehicle.

2. A protective shield for mounting an electronic toll collection identifier on an outside surface of a motor vehicle, wherein said electronic toll collection identifier includes a protective box for electronic circuitry, wherein the protective shield comprises: a flat, rectangular shaped base of a strong, sturdy, protective material with openings at the four corners; and outwardly extended rubber-coated arms integrally made with said base; wherein said electronic toll collection identifier is mounted on said base of said protective shield and said protective shield is mounted on said motor vehicle by means of screws which are inserted through said openings in said base and secured within openings on said motor vehicle, and wherein said rubber-coated arms of said protective shield surround said electronic toll collection identifier and protect it from frontal impact while mounted on said motor vehicle.

3. A protective shield according to claim 2, wherein said rubber-coated side arms of said protective shield further include hooks on inside surfaces which engage with openings on sides of said protective box of said electronic toll collection identifier.

* * * * *